United States Patent [19]

Schregenberger

[11] 3,958,683

[45] May 25, 1976

[54] CONVEYOR SYSTEM INCLUDING ARTICLE REGROUPING APPARATUS

[75] Inventor: Alex J. Schregenberger, Neshanic, N.J.

[73] Assignee: Midland-Ross Corporation, Cleveland, Ohio

[22] Filed: Sept. 27, 1974

[21] Appl. No.: 510,049

[52] U.S. Cl. .......................... 198/22 R; 198/31 AB; 214/1 BT
[51] Int. Cl.² ......................................... B65G 47/00
[58] Field of Search .......... 198/31 AA, 31 AB, 102, 198/106, 31 R, 29, 22 R, 22 B, 30, 179; 214/1 BS, 1 BT

[56] References Cited
UNITED STATES PATENTS

| | | | |
|---|---|---|---|
| 3,262,243 | 7/1966 | Molins | 198/31 AB |
| 3,766,851 | 10/1973 | Sirvet et al. | 198/22 B |
| 3,826,381 | 7/1974 | Kulig et al. | 214/1 BT |

Primary Examiner—Robert J. Spar
Assistant Examiner—James M. Slattery
Attorney, Agent, or Firm—Woodrow W. Portz

[57] ABSTRACT

The conveyor system to be disclosed is an apparatus arrangement wherein a procession of beverage cans or like articles enter the system as a single file stream which is redistributed into a multiple-row stream of articles standing on end on a slowly moving wide-belt conveyor. Essential elements of the system are a feed conveyor for progressing the articles in single file order into a transfer region, a wide-belt conveyor for transferring the articles in a lateral direction from the feed conveyor outwardly of the system, and a transfer conveyor capable of picking up groups of single file-articles and depositing them to form multiple rows on the wide-belt conveyor.

8 Claims, 8 Drawing Figures

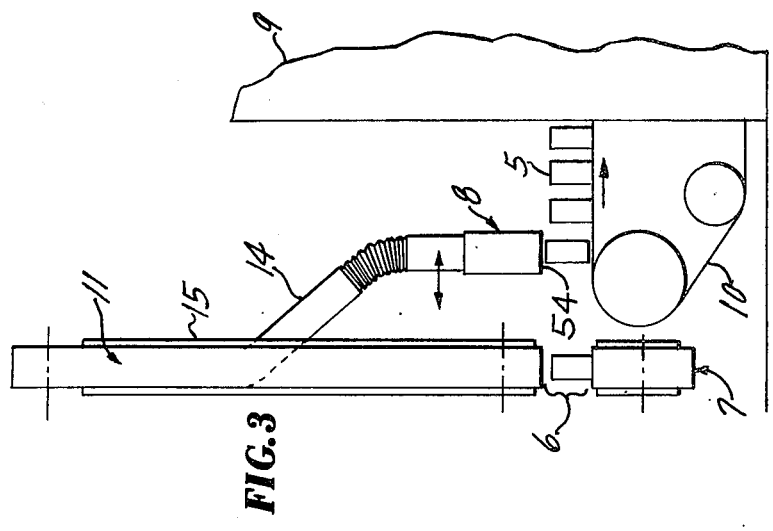
FIG. 3
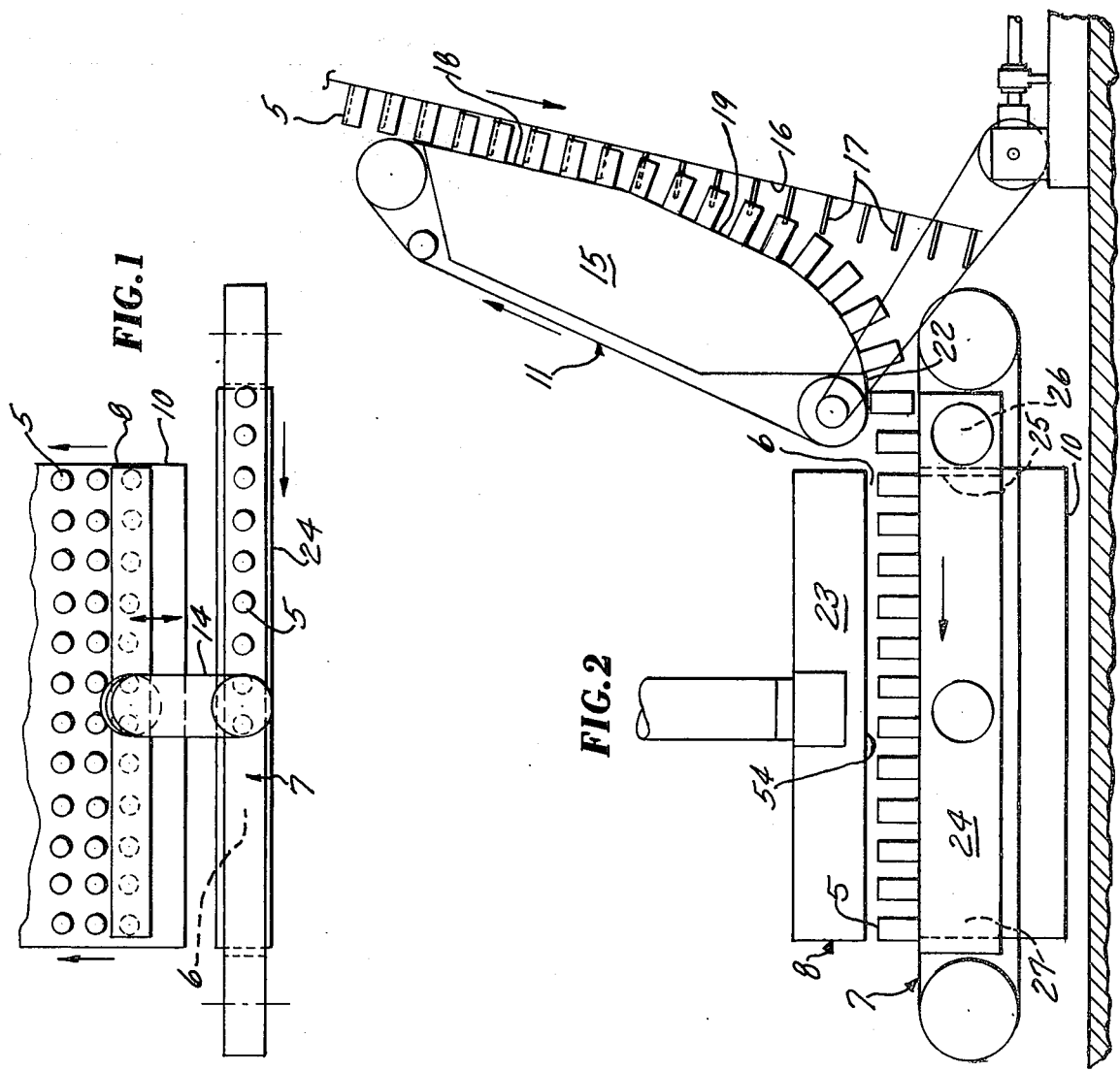
FIG. 1
FIG. 2

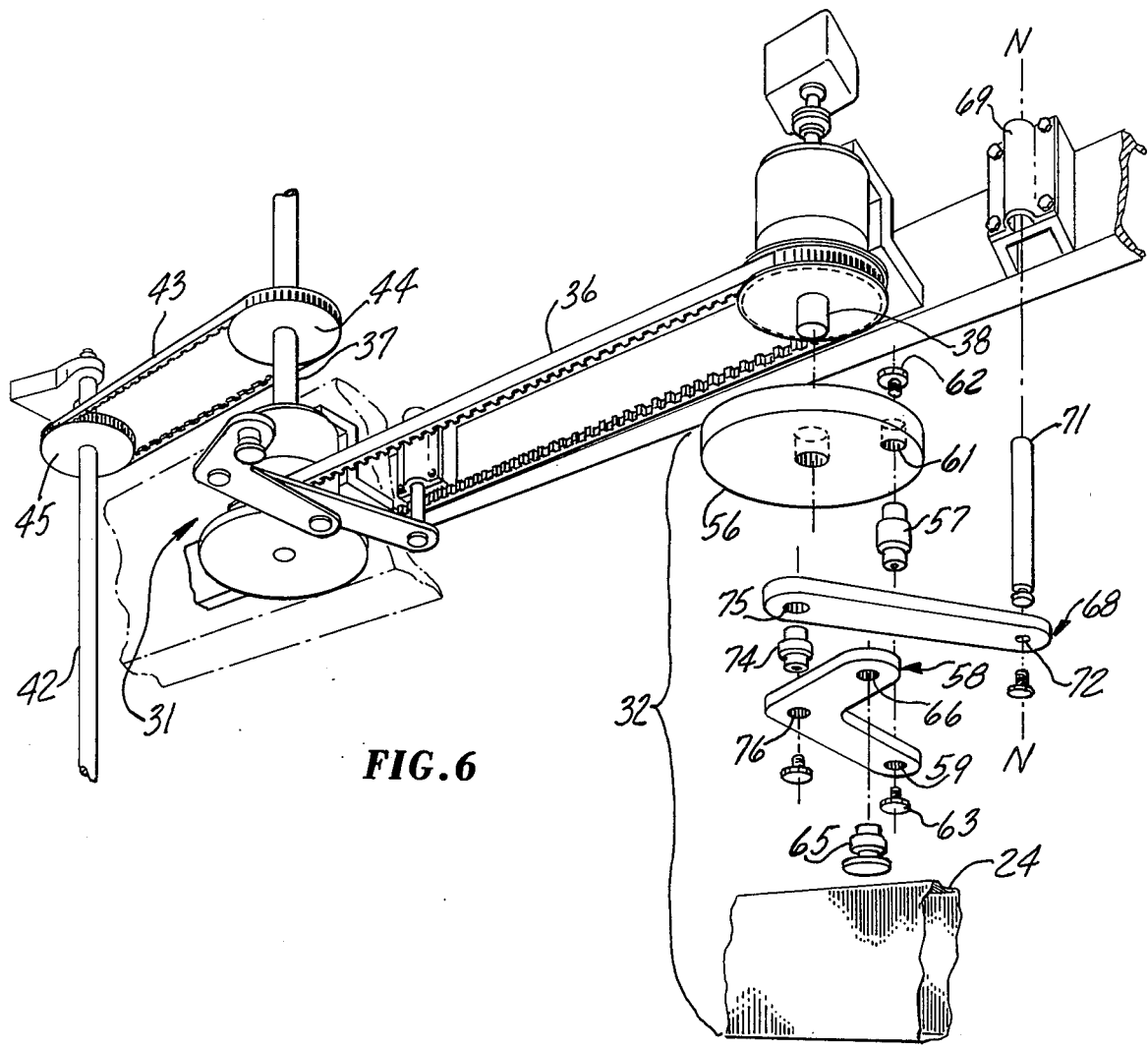
FIG. 6
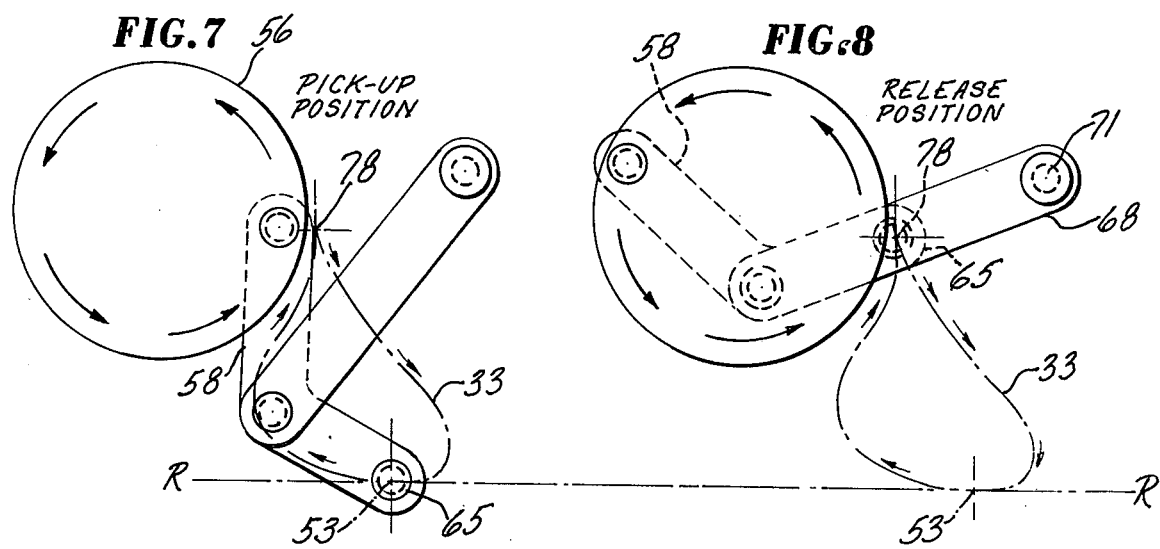
FIG. 7  PICK-UP POSITION
FIG. 8  RELEASE POSITION

CONVEYOR SYSTEM INCLUDING ARTICLE REGROUPING APPARATUS

BACKGROUND OF THE INVENTION

In the printing or coating of beverage cans, it is conventional to carry the cans away from a printer or coater on a "pin-chain" conveyor and transport them through many festoons of the pin-chain conveyor within a dryer chamber. The so-called pin oven is expensive because of its excessive size and the operational and maintenance problems which arise out of the movement of a lengthy section of the pin-chain conveyor through the pin oven. The cost of the pin-oven equipment increases as an exponential function with increase in conveyor speed. At production rates exceeding six hundred cans per minute, the pin ovens are generally impractical in size and cost. However, coating and printing technology has developed to the extent that equipment is available for coating and printing at rates up to 1,000 cans per minute. As such equipment includes pin conveyors which ordinarily continue their travel through a curing oven, the potential utilization of such equipment is severely limited because of the impracticability of curing the coated or printed cans while on a pin conveyor at rates above 600 cans per minute.

As objects of the invention, it is desirable (1) to provide machinery for regrouping flat-end cylindrical articles entering a transfer region in single file procession while standing on one of the respective ends into a multiple-row succession of articles standing on respective ends while proceeding away from the transfer region; (2) to provide a conveyor system for regrouping flat-end articles of uniform length which are coated with an uncured or tacky material without allowing the articles to touch each other; (3) to provide machinery of a "breakthrough" type which combines the production advantages of a pin conveyor handling with wide-belt curing and heating equipment; and (4) to provide a can handling system which will receive cans or other hollow articles having an open end and uniform length from a pin type conveyor and redistribute the cans on a much wider flat belt conveyor, without allowing the exterior surfaces of the cans to contact each other, in order to achieve the curing capacities of flat belt ovens.

SUMMARY OF THE INVENTION

The invention resides in a conveyor system for handling articles having parallel flat ends and preferably uniform length between such ends, including (1) one or more types of conveyors which feed the articles while standing on end in straight line procession into a transfer region, (2) an upwardly-facing relatively-wide conveyor capable of supporting a plurality of rows of articles proceeding away from the transfer region at right angles with the direction of movement of the single file conveyor, and (3) a transfer conveyor including a motion-developing mechanism enabling a cycle of movement wherein the transfer conveyor synchronizes with the movement of the single line conveyor for a short time interval including the instant of article pick-up and continues movement into synchronization with the movement of the multiple-row conveyor for a short time interval including an instant of article release. To accomplish article pick-up and release, the transfer conveyor comprises article attracting means such as a longitudinally slotted pick-up area of which the slot is in communication with a vacuum source which can be activated and deactivated to accomplish article pick-up and release, respectively.

In one practical form of the invention, the article-supplying portion of the conveyor or system includes a pin conveyor extending into tangency or parallel relation with an article-attracting conveyor actuated, e.g., by vacuum, with downstream portions of these two conveyors diverging away from each other to separate the articles from the pin conveyor and thus deliver them to a transfer conveyor which delivery may involve another horizontally aligned single file conveyor extending into the transfer region.

The mechanism for causing the transfer conveyor to traverse a generally napiform path comprises one or more sets of crank and linkage systems wherein each system comprises a bell crank attached at one end to the transfer conveyor body. The other end of the bell crank is attached to a crank. A radius bar having a fixed pivot at one end is attached by its other end to an intermediate apex point of the bell crank.

BRIEF DESCRIPTION OF THE DRAWING

FIG. 1 is a schematic plan view illustrating an apparatus in which cylindrical articles standing on end enter a transfer region on a single file conveyor and are transferred by an oscillating transfer conveyor to a wide, slow-moving conveyor to be carried away from the transfer zone. The transfer conveyor is shown positioned over the wide conveyor.

FIG. 2 is a schematic end elevation of the apparatus of FIG. 1 illustrating cylindrical articles descending single file and then carried by a horizontal conveyor into a transfer region wherein they are presented for pick-up for transfer to the wide conveyor shown in FIG. 1.

FIG. 3 is a schematic fragmentary side elevation illustrating the lateral proximity of the wide multiple-row conveyor with the single file conveyor illustrated in FIGS. 1 and 2. The transfer conveyor is shown positioned over the wide conveyor.

FIG. 6 is a perspective view looking in an oblique upward direction of crank and link mechanism comprising two assemblies, one being exploded, for effecting cyclic motion of the transfer conveyor.

FIGS. 7 and 8 are diagrammatic plan views of the crank and link mechanism illustrating two positions thereof in developing a napiform path, i.e., the pick-up and release positions.

DESCRIPTION OF THE PREFERRED EMBODIMENT

Figure 4:
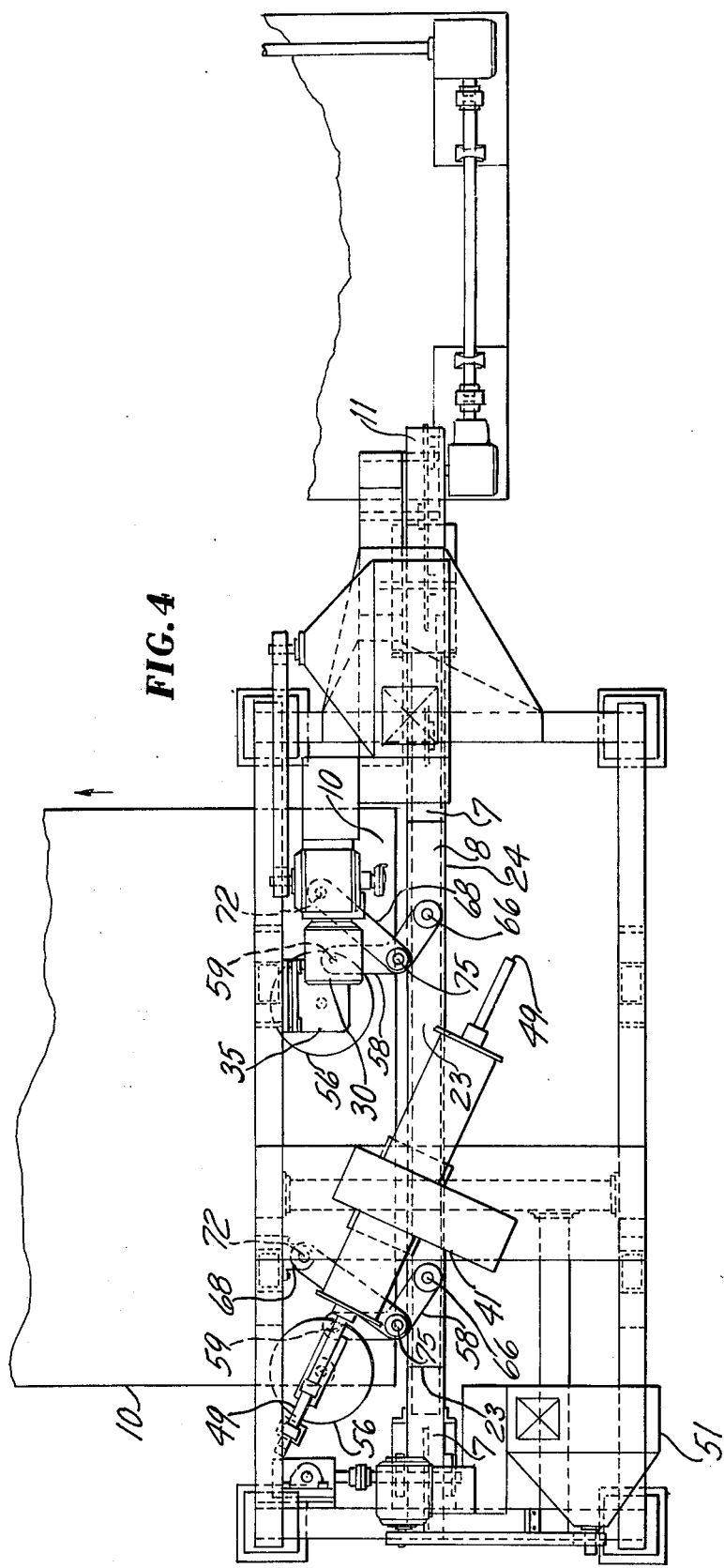
FIG. 4 is a fragmentary plan view illustrating details of apparatus shown schematically in plan in FIG. 1.

FIGS. 1, 2 and 3 illustrate schematically in fragmentary plan, end and side views, respectively, apparatus for conducting a single file procession of uniformly sized articles with flat parallel ends, e.g., beverage cans with one end open, into a transfer region 6 located generally over the upper pass a first belt-like conveyor 7 and below a transfer conveyor 8 when the latter conveyor is positioned directly above the conveyor 7 at its article pick-up position as shown in FIG. 2. FIGS. 1 and 3 illustrate the transfer conveyor in the article release position in which it is positioned over the article receiving portion of a second belt-like conveyor 10, i.e., wide, slow-moving conveyor capable of supporting a plurality of rows of beverage cans for passage through an oven 9.

In the embodiment being described, article attraction to conveyors 7 and 8 and another conveyor 11 which deliver the work articles to conveyor 7 is accomplished by vacuum. In each case, the conveyor is provided with a vacuum plenum apertured along its article supporting section to effect movement of the articles as desired. It will be noted that the transfer conveyor 8 is essentially a vacuum plenum slotted along its underside and connected with a vacuum pump by a flexible duct 14. For purposes of illustration, the mechanism for reciprocating the conveyor 8 is purposely omitted in FIGS. 1, 2 and 3.

Figure 5:
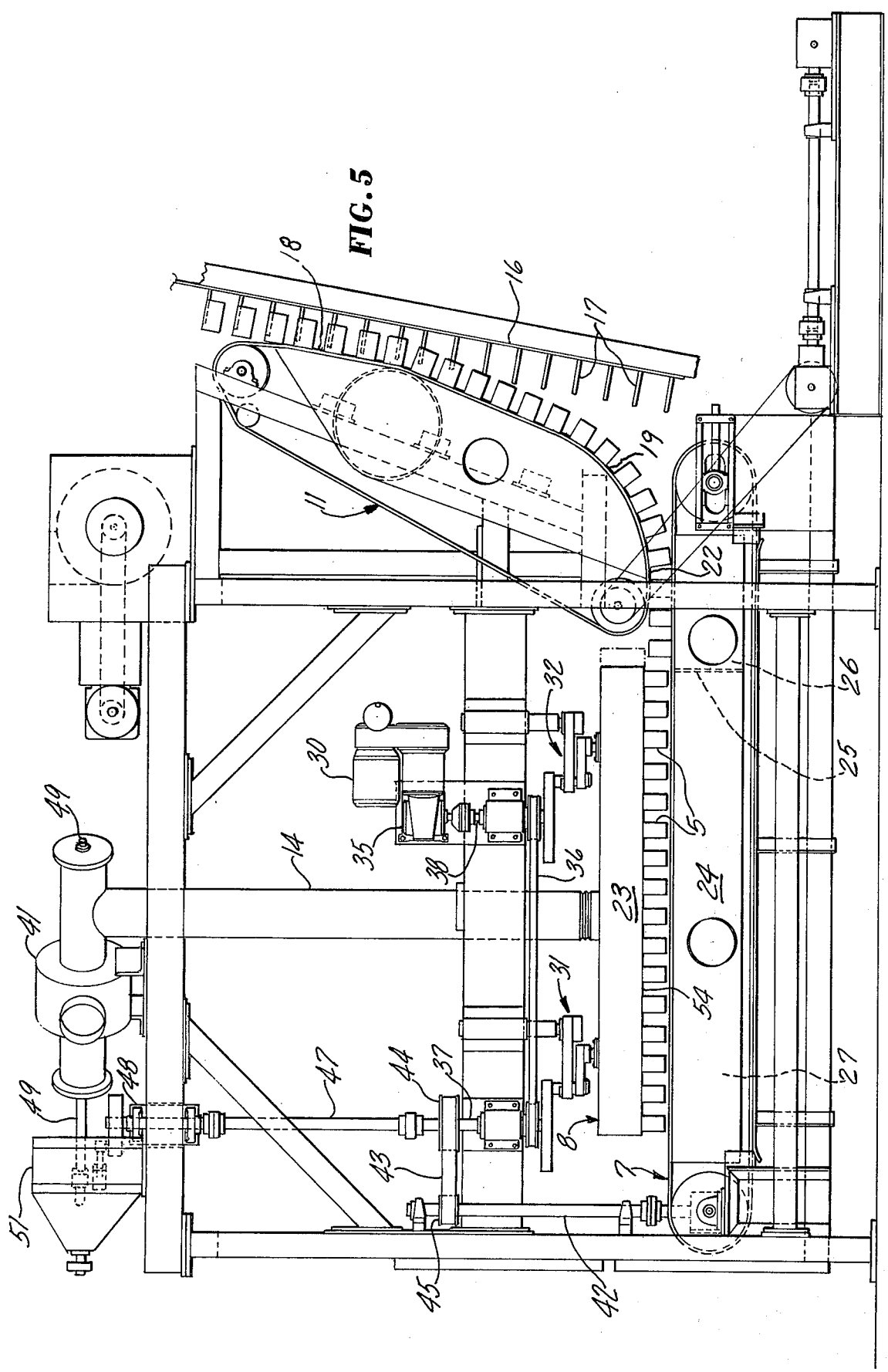
FIG. 5 is an end elevation with respect to the wide multi-row conveyor illustrating especially the single file conveyors in side elevation in more detail than the schematic view of FIG. 2.

The conveyor 11 along with its vacuum plenum chamber 15 is especially designed for attracting articles to it carried on a pin conveyor 16 and gradually withdrawing the articles from pins or pegs 17 of the conveyor 16. In this manner, articles, such as closed at one end and open at the other, are removed from the pins of the rectilinear section of the pin conveyor 16. The plenum 15 of conveyor 11 has an upstream surface 18 and a belt portion thereover which are parallel to the pin conveyor 16. A downstream surface 19 of the plenum 15 which supports the belt portion of conveyor 11 diverges from the linear direction of the pin conveyor by an angle, e.g., of 10°, to achieve at least a divergence more than equal to the length of the pins of the conveyor 16. The belt of conveyor 11 is perforated, e.g., mid-way between its opposite edges to allow application of vacuum to the opposed closed ends of the cans 5. Along surface 18 of the plenum the cans 5 are firmly fixed to the surface of the belt of conveyor 11, e.g., by a negative pressure of 7 or 8 inches water column, and remain so as the belt passes over the surface 19 to carry the cans into longitudinal clearance with the pins 17 of conveyor 16. Surface 19 is further shaped in a parabolic curve to achieve tangency with a plane parallel to the upward facing pass of the conveyor 7, such plane being spaced from the conveyor at least the height of the cans 5. As FIGS. 2 and 5 illustrate, the conveyor 11 includes a section 22 of surface 19 which extends horizontally beyond the plenum 15 so as to extend a portion of the belt of conveyor 11 over the conveyor 7 which is not subject to the vacuum of the plenum 15. This arrangement allows the cans 5 to be dropped on the belt of conveyor 7 and pass into the influence of the vacuum facility thereof. Preferably, the plenum 24 of the conveyor 7 is constructed in two compartments separated by a wall 25 which enable a relatively high vacuum to be within chamber 26 and a relatively weak vacuum to exist in chamber 27. Chamber 27 corresponds to the length of the article transfer region 6 within which articles, i.e., cans 5, are attracted away from the upper surface of the belt of conveyor 7 by the transfer conveyor 8. To communicate the lower than atmospheric pressures of compartments 26, 27 to the cans, the belt of conveyor 7 is apertured intermediately along its width. As examples of satisfactory pressures are maintained in compartments 26, 27, a accomplishing of 3 inches water column is obtained in compartment 26 while a vacuum of around one-half inch water column is maintained in compartment 27.

The negative or vacuum pressure of the transfer conveyor 8 at the instant of pick-up is substantially higher than that maintained in the compartment 27 of conveyor 7. In practice, the negative pressure in the plenum 23 of conveyor 8 used to attract cans away from the belt as it passes over the plenum chamber 27 is approximately 8 inches water column.

As shown in FIG. 5, a motor 30 drives the twin oscillating mechanisms 31, 32 on which the transfer conveyor 8 is supported in accomplishing a planate cyclical napiform path 33 illustrated in FIGS. 7 and 8. FIG. 5 shows the motor, through a right angle drive 35, to be in direct drive with the mechanism 32 and in belt drive relationship with mechanism 31 through an interiorly toothed connecting belt 36 and associated sprockets between respective drive shafts 37, 38 of the oscillating mechanisms.

As there must be a timed relationship or synchronism between the application of vacuum pressure to the plenum 23 of transfer conveyor 8, the conveyor 7, and the oscillating mechanisms 31, 32 thereof, drive power for a vacuum valve 41 and the conveyor 7 originates in the motor 30 through driving lines connected with the drive shaft 37 of oscillating mechanism 31. The drive for the conveyor 7 is transmitted to a drive shaft line 42 of the conveyor 7 through an interiorly toothed belt 43 and associated sprockets 44, 45 on shafts 37, 42, respectively. The valve 41 is driven from shaft 47 through a coaxial shaft 47 terminating in a mechanism 48 for reciprocating an actuating shaft 49 of the valve 41. The valve 41 is connected to a suction fan 51 to complete the vacuum supply equipment for the transfer conveyor through line 14. The valve 41 suddenly opens as the conveyor reaches a point 53 in its cycle over the conveyor 7. Because of the substantially greater vacuum in the plenum of conveyor 23 than in the plenum compartment 27 of conveyor 7, the cans 5 are attracted upwardly onto the downward facing pick-up area 54 of conveyor 8.

FIGS. 6, 7 and 8 illustrate the oscillating mechanisms 31 and 32 in greater detail. Both mechanisms are identical and accomplish the napiform path 33 as illustrated in FIGS. 7 and 8.

As shown in FIG. 5, all similar portions of mechanisms 31 and 32 occur in planes parallel to the upper surface of conveyor 7 and thus cause any portion of the conveyor 8 to move in a planate napiform path. The path 33, as shown in FIGS. 7 and 8, is somewhat asymetrical or lopsided because of the dimensional relationships within the particular crank and lever system selected and the relative locations of conveyors 7 and 10. The term "napiform" is used in its ordinary dictionary meaning to indicate turnip shapeness. With reference to the side profile of a turnip, the flat upper side of the turnip is represented by the portion of the path 33 lining up in parallelism with the direction of movement of cans by the conveyor 7 as shown in FIG. 7. The lower tip of a turnip profile is typified in FIG. 8 by the deposition of cans on conveyor 10 at point 78. With attention now to mechanism 32 as shown in exploded form in FIG. 6, a disc 56 fixed to the lower end of shaft 38 is connected by a pin 57 which is secured to a bell crank lever 58 through an aperture 59 and to the disc 56 through an aperture 61 thereof. The pin may be rotatable within either the disc or the bell crank. The disc 56 functions as a crank which rotates with less vibration constructed than a simple crank. Screws 62, 63 are received in the ends of the pin 57 for the purpose of securing the pin to the disc 56 and the bell crank. The other end of the bell crank 58 is pivotally secured to the plenum 23 of the conveyor 8 by a pin 65 fixedly anchored to the plenum but pivotally connected to the bell crank at the aperture 66 thereof.

The bell crank connection of the plenum 23 and the disc-like crank 56 would be uncontrollable if it were not for a radius lever 68 supported along a fixed pivotal axis N-N in an end bearing 69 fixed to the machine frame by means of a pin 71 housed therein with its lower end connected to the lever 68 through an aperture 72 thereof. The other end of the radius lever is pivotally connected by a pin 74 having one end extending through an aperture 75 of the lever and its other end extending through aperture 76 of the bell crank. The latter aperture occurs at an intermediate point along the bell crank, i.e., the apex point of the angular configuration formed by apertures 59, 76 and 66.

FIGS. 7 and 8 illustrate either of the mechanisms of FIG. 6 at an article pickup point and an article release point, respectively. FIG. 7 shows the pin 65 which accurately follows the napiform path 33 centered over pickup point 53. In movement of the plenum 24 to a position corresponding to point 53, the valve 41 opens to a position connecting the plenum with a vacuum source, e.g., the suction fan 51. It will be observed from the shape of the path 33 that the pin 65 is traveling generally parallel to the longitudinal axis R-R of the conveyor 7 at the instant of pick-up. As the disc rotates approximately 180° from the position of FIG. 7, the pin 65 traverses the napiform path in the direction of the arrows to reach an article release point 78 again under the axis of pin 65 which has become positioned immediately under the lever 68. As point 78 is reached, the valve 41 is actuated to let atmospheric air into the plenum 24 to raise the absolute pressure (or reduce the vacuum) therein to release the articles supported at the area 54.

As shown in FIG. 3, the upward facing can-supporting surfaces of the conveyors 7 and 10 extend at the same level. FIG. 2 also shows that the pickup area 54 of the transfer conveyor 8 is located at a level higher than the height of the cans supported on the conveyor 10, and that the conveyor 8 is in the act of dropping cans onto the conveyor 10. FIG. 2 shows conveyor 8 to have vertical clearance with cans 5 supported on the conveyor 7 thereby disposing the pickup surface 54 at a height above the conveyor 7 greater than the height of the cans 5. FIG. 5 shows the cans 5 in adhered relation with the pickup area 54 of conveyor 8 and with clearance between the cans 5 and the upper surface of conveyor 7 after traversing the clearance under action of vacuum exerted from the plenum 23 of conveyor 8.

What is claimed is:

1. A conveyor system for articles characterized by opposite flat ends in parallel relationship, such as cylindrical containers, comprising:
    a first belt-like conveyor having a path of movement extending lengthwise of an article transfer region of predetermined length and fixed location into which said conveyor faces;
    means for placing a single-file succession of said articles to rest with one of the respective ends on said first conveyor outside said transfer region to pass in a procession therethrough;
    a second relatively wide belt-like conveyor having a path of movement extending transversely away from the path of movement of said first conveyor, and having an article-receiving end portion in spaced laterally opposite relation with that portion of said first conveyor in said transfer region;
    an elongate transfer conveyor having an article pickup area of length substantially equal to that of said transfer region;
    reciprocating means for supporting and cyclically moving the transfer conveyor comprising means for guiding the transfer conveyor along a planate napiform path from a position in said transfer region wherein said pickup area faces said first conveyor in generally parallel relation therewith, and said area is spaced perpendicularly to the first conveyor at a desired spacing slightly greater than the dimension of said articles between said flat sides to a position spacing said area over said article-receiving end portion of the second conveyor at approximately said desired spacing;
    said transfer conveyor comprising article attracting means operable to lift articles from a section of said first conveyor in said transfer region and to adhere them by respective flat ends to said pickup area, and thereafter to release them to said second conveyor by depositing the articles with the opposite of said ends on the second conveyor;
    control means controlling said attracting means to attract articles while in said transfer region and to release the attracted articles from said area while in said position over said article-receiving section.

2. The conveyor system of claim 1 wherein:
    said attracting means is a chamber connected to a vacuum source, and said area is defined by an apertured wall of said chamber, and said system includes a valve in intermediate duct relation with said source and said chamber.

3. The conveyor system of claim 2 comprising:
    drive means synchronously connecting said valve and said reciprocating means in an arrangement for opening said valve over said first conveyor and closing said valve over said second conveyor.

4. The conveyor system of claim 3 wherein:
    said drive means is connected with the first conveyor, said reciprocating means, and said valve for synchronous operation thereof.

5. The conveyor system of claim 1 wherein:
    said first conveyor is apertured intermediately of its width and along its length; and
    said system comprises a second vacuum chamber in communication with said first conveyor throughout the length of said transfer region.

6. The conveying system of claim 1 comprising:
    a third belt-like conveyor comprising article-attracting means and means for controlling said article-attracting means;
    said third conveyor extending downwardly and then into tangency with a plane parallel to the article-receiving surface of said first conveyor spaced therefrom at least the dimension of said articles between said flat ends.

7. The conveying system of claim 1 comprising:
    a pin conveyor comprising a multiplicity of article-supporting pins and means for supporting said pins in spaced parallel, laterally projecting relation therealong, said pin conveyor traversing a downward path in which the lengths of said pins project at least horizontally to upwardly from the support means;
    a third belt-like conveyor facing said pin conveyor along said path and comprising article-attracting means for attaching said articles thereto, and means for controlling the article-attracting means;

said third conveyor being located at close proximity with the ends of said pins along an upstream portion of said downward path, said third conveyor and the pin conveyor being shaped to diverge in downward directions to an extent causing articles attached to said third conveyor to effect complete longitudinal displacement from the lengths of the pins;

said third conveyor being shaped to carry said articles into a position wherein the lengths of the articles attached thereto are perpendicular to said first conveyor and the ends of said articles facing away from said third conveyor are in close proximity to that portion of the first conveyor in the article-receiving end of said transfer region.

8. The conveying system of claim 1 comprising:

a pin conveyor comprising means for supporting a moving procession of article-supporting pins which project from the supporting means in a lengthwise direction in lateral relation with the direction of movement of the pin conveyor, said pin conveyor traversing a downward path in which the lengths of said pins are oriented from horizontally to upwardly from its support means;

a third belt-like conveyor facing said pin conveyor along said path, said third conveyor having a section open at points intermediately along its width opposite said pins;

vacuum means acting through said open section on the side of said third conveyor facing away from the pin conveyor to attract and attach said articles to said third conveyor;

said third conveyor being located at close proximity with the ends of said pins along an upstream portion of said downward path, said third conveyor and the pin conveyor being shaped to diverge in downward directions to an extent causing articles attached to said third conveyor to effect complete displacement of the articles relative to the lengths of the pins;

said third conveyor being shaped to carry said articles into a position wherein the lengths of the articles attached thereto are perpendicular to said first conveyor and the ends of said articles away from said third conveyor are in close proximity to that portion of the first conveyor in the article-receiving end of said transfer region.

* * * * *

UNITED STATES PATENT AND TRADEMARK OFFICE
CERTIFICATE OF CORRECTION

PATENT NO. : 3,958,683
DATED : May 25, 1976
INVENTOR(S) : Alex J. Schregenberger It is certified that error appears in the above—identified patent and that said Letters Patent are hereby corrected as shown below:

Column 2, line 4, after "conveyor" delete "or".

Column 3, line 61, "accomplish-" should be --vacuum--; line 62, "ing" should be deleted.

Column 4, line 6, "accmplishing" should be --accomplishing--.

Signed and Sealed this

Thirty-first Day of August 1976

[SEAL]

Attest:

RUTH C. MASON
Attesting Officer

C. MARSHALL DANN
Commissioner of Patents and Trademarks